US012655043B2

(12) United States Patent　　　　　(10) Patent No.:　US 12,655,043 B2
Kim　　　　　　　　　　　　　　　　(45) Date of Patent:　　Jun. 16, 2026

(54) WATER TREATMENT SYSTEM FOR SHOWERS

(71) Applicant: U&G TECHNOLOGY CO., LTD., Incheon (KR)

(72) Inventor: Sanguk Kim, Incheon (KR)

(73) Assignee: U&G TECHNOLOGY CO., LTD., Incheon (KR)

(*) Notice: Subject to any disclaimer, the term of this patent is extended or adjusted under 35 U.S.C. 154(b) by 387 days.

(21) Appl. No.: 18/519,574

(22) Filed: Nov. 27, 2023

(65) Prior Publication Data

US 2024/0199450 A1　　Jun. 20, 2024

(30) Foreign Application Priority Data

Dec. 14, 2022　(KR) ......................... 10-2022-0174892

(51) Int. Cl.
C02F 1/46　　　　　(2023.01)
(52) U.S. Cl.
CPC .......... C02F 1/46 (2013.01); *C02F 2201/004* (2013.01); *C02F 2307/06* (2013.01)
(58) Field of Classification Search
CPC ... A47K 3/281; B05B 1/18; C02F 1/46; C02F 1/48; C02F 5/00; C02F 2201/009; C02F 2307/06
See application file for complete search history.

(56) References Cited

U.S. PATENT DOCUMENTS 10,246,352 B2 *　4/2019　Kim ...................... C02F 1/4608

FOREIGN PATENT DOCUMENTS

KR　　10-2012-0050604 A　　5/2012
KR　　　20210057294 A　*　5/2021　.............. C02F 1/481

OTHER PUBLICATIONS

Yun, Jae Kuk—KR 10-2021-0067294 FIT merged original and translation—May 21, 2021 (Year: 2021).*

* cited by examiner

*Primary Examiner* — Bradley R Spies
(74) *Attorney, Agent, or Firm* — You & IP, LLC

(57)　　　　　　ABSTRACT

A water treatment system for a shower is provided, in which a high voltage part is installed in a head of the shower to convert the electrical power generated in response to inflow and outflow of water into a high voltage, and a high voltage part and a ground part are installed close to each other, with a (+) electrode of the high voltage part being connected to the high voltage part and a (−) electrode being connected to the ground part so that water is passed through static electricity generated between the high voltage part (+) and the ground part (−), thus providing the effect of ability to change the hardness of the flowing water and be used for a long period of time through self-generated electrical power.

4 Claims, 5 Drawing Sheets

WATER TREATMENT SYSTEM FOR SHOWERS

CROSS-REFERENCE TO RELATED APPLICATION

This application claims priority to Korean Patent Applications No. 10-2022-0174892, filed in the Korean Intellectual Property Office on Dec. 14, 2022, the entire contents of which are hereby incorporated by reference.

TECHNICAL FIELD

The present disclosure relates to a water treatment system for a shower, and specifically, to a water treatment system for a shower, which is capable of changing the hardness of flowing water and which can be used for a long period of time through self-generation, in which a high voltage part is installed in the head of the shower to convert electrical power generated in response to the inflow and outflow of water into a high voltage, and in which the high voltage part is provided close to a ground part, with a (+) electrode of the high voltage part being connected to the high voltage part and with a (−) electrode being connected to the ground part, so that water is passed through static electricity generated between the high voltage part (+) and the ground part (−).

BACKGROUND

In recent years, along with industrial development, bathing facilities with various functions have been developed.

For example, showers that are commonly used in homes can not only spray water, but also provide, with a lamp added thereto, aesthetic effect or display colors that change according to water temperature so that the user intuitively knows the water temperature.

Multi-shower with various spray nozzles is also known, which includes a lamp that illuminates the shower booth, an LCD screen that displays the current time, temperature, water temperature, etc. and is even equipped with a radio and music file player, allowing users to shower conveniently and enjoyably.

Additionally, a related electrical energy generator has been suggested, which supplies the electricity required for the operation of bathing facilities that perform the various functions described above through self-generation.

This related electrical energy generator includes turbine blades rotated by the water pressure of water flow in a water pipe to obtain power, a turbine shaft installed on the turbine blades and rotated, and a generator coupled to the turbine shaft and generating electrical energy, and also includes a guide plate that guides the path of water flow in the water pipe, and a water pressure deviation housing formed on an upper side of the guide plate to receive the turbine blades therein, and inducing a water pressure difference on the upper and lower sides of the turbine blades.

Accordingly, in the related electric energy generator, the turbine blades are rotated along the water flow passing through the water pressure differential housing, and the rotational force of these turbine blades rotates the generator to generate the electrical energy.

However, such related electrical energy generator has a disadvantage in that, if the amount of water flow in the water pipe is small, the turbine blades cannot be rotated due to low water pressure, and electricity cannot be generated uniformly.

In addition, since the water hits only one side of the turbine blade, there is a problem that there is loss of the kinetic energy of the water and it is not sufficiently used as an external force to rotate the turbine blades.

Considering this, "Water pressure generator and shower device using the same" has been proposed in Korean Patent Publication No. 10-2012-0050604 (Patent Application No. 10-2010-0111938).

The shower device using the related water pressure generator includes: a main body in which an water inlet hole and a water outlet hole are perforated on both sides to be connected to an internal space, and water introduced into a water inlet hole swirls around the internal space and is discharged through a water outlet hole; and a power generation unit including an impeller installed in the internal space and rotating according to the flow of water swirling around the internal space, and having a first magnet fixed therein, a rotor and a stator that are coupled to a surface of the main body perpendicular to the rotation axis of the impeller, have a drive shaft disposed on the same straight line as the rotation axis, and are rotated relative to the drive shaft, and a second magnet mounted at an end of the drive shaft, which reacts with the first magnet, in which the internal space has a cylindrical shape in which the impeller is mounted, and includes a rotating space connected to the water outlet hole, a rotation water channel extending along a circumference of the rotating space starting from the water inlet hole, and at least one connection hole connecting the rotation space and the rotation water channel in the direction in which the water swirls, the rotation water channel is disposed on an upper side of the rotation space, and the water outlet hole is connected to a bottom of the rotation space, the impeller includes a body having a fixing space provided therein where the first magnet is fixed, a plurality of side wings extending laterally from the top of the body and bent in the direction of water flow through the connection hole, and a bottom wing extending horizontally from the bottom of the side wings and having an end bent in a vertically upward direction, and also includes a lamp including a coupling pin penetrating the inside of the impeller along the rotation axis and coupled to the main body so as to be electrically connected to the power generation unit.

However, a shower device using the related water pressure generator configured as described above uses the power generation unit for simple functions such as lighting a lamp, displaying an LCD screen, or operating a terminal that operates as a radio or a music file player as described above, and has a disadvantage of not meeting consumers' demands for water quality improvement.

SUMMARY

Accordingly, the present disclosure has been made to solve the problems described above, and an object of the present disclosure is to provide a water treatment system for a shower, which is capable of changing the hardness of flowing water and which can be used for a long period of time through self-generation, in which a high voltage part is installed in the head of the shower to convert electrical power generated in response to the inflow and outflow of water into a high voltage, and in which the high voltage part is provided close to a ground part, with a (+) electrode of the high voltage part being connected to the high voltage part and with a (−) electrode being connected to the ground part, so that water is passed through static electricity generated between the high voltage part (+) and the ground part (−).

Other objects of the present disclosure will be clear upon reading the description below.

Solution to Problem

The present disclosure for achieving the object described above is a water treatment system for a shower, which may include a handle 11 formed on one side and connected to the faucet via a hose, a front cap 12 openably formed on a front side and having a plurality of water spray holes, and, formed inside, a power generation unit 110 installed in a space defined in a head 13 of the shower 10, and formed with an inlet hole and an outlet hole so as to be rotated by inflowing and outflowing water and generate electricity energy, a generator fixing member 120 formed in the shape of a paper cup in cross section, by which the power generation unit 110 is inserted to a center of a bottom surface and fixed so as to allow water discharged through the outlet holes to flow, a ground part 130 made of a conductor and installed with one end being seated on the generator fixing member 120 to be connected to a (−) electrode, and with front and bottom surfaces being open so as to allow inflowing water to flow while coming in contact with a surface, a gap maintaining member 140 installed within the ground part 130, with one end being airtightly retained on an outer peripheral surface of the power generation unit 110 by the intervention of an O-ring, and with the outer peripheral surface gradually expanding from one end to the other end, a high voltage part 150 made of a conductor, being inserted with one end into the gap maintenance member 140 and is connected to a (+) electrode to enable static electricity to be generated between itself and the ground part 130, and a high voltage converter 160 fixedly installed by epoxy filled in the gap maintenance member 140, and converting a voltage supplied from the power generation unit 110 into a high voltage so that the (+) electrode can be connected to the high voltage part 150 and the (−) electrode can be connected to the ground part 120.

In addition, on the outer peripheral surface of the gap maintaining member 140, there are a plurality of gap maintaining protrusions 141 formed at regular intervals in a radial direction so as to maintain a constant gap between the ground part 130 and the high voltage part 150.

As described above, according to the water treatment system for a shower according to the embodiments, a high voltage part is installed in the head of the shower to convert the electrical power generated in response to the inflow and outflow of water into a high voltage, and the high voltage part and the ground part are installed close to each other, with the (+) electrode of the high voltage part being connected to the high voltage part and the (−) electrode being connected to the ground part, so that water is passed through static electricity generated between the high voltage part (+) and the ground part (−), thus providing the effect of ability to easily change the hardness of the flowing water and be used for a long period of time through self-generated electrical power.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
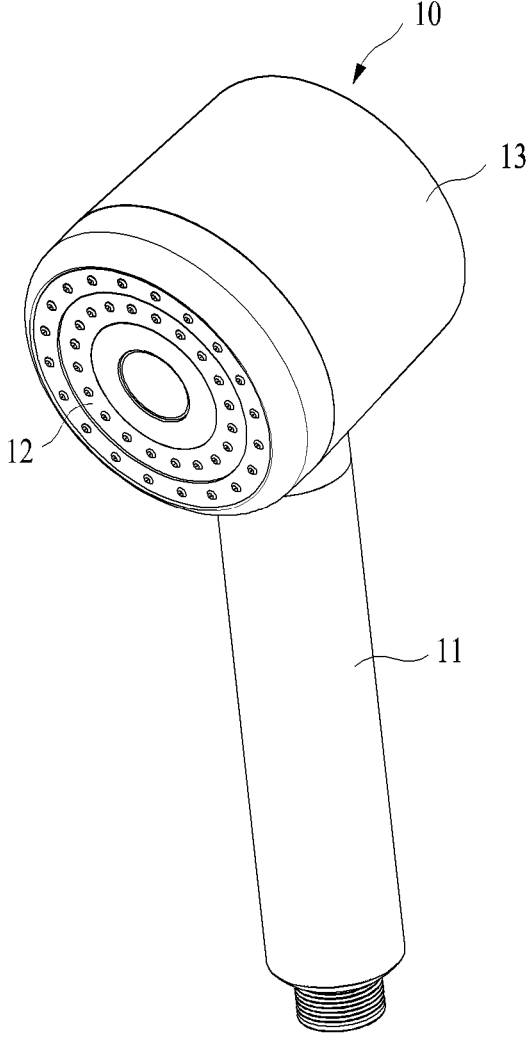
FIG. 1 is a diagram showing a shower including a water treatment system for a shower installed therein according to an embodiment.

Hereinafter, an embodiment of the water treatment system for a shower according to embodiments of the present disclosure will be described in detail.

First, it should be noted that among the drawings, identical components or parts are given the same reference numerals as much as possible. In describing the present disclosure, detailed descriptions of the related well-known functions or configurations are omitted in order to not obscure the gist of the disclosure.

As shown, the water treatment system for a shower according to an embodiment is configured to change the hardness of the water by causing the inflowing water to pass between a high voltage part (+) and a ground part (−) that are close to each other.

That is, the water treatment device 100 for a shower according to the embodiment described above may include a handle 11 formed on one side and connected to the faucet via a hose, a front cap 12 openably formed on a front side and having a plurality of water spray holes, and, formed inside, a power generation unit 110 installed in a space defined in a head 13 of the shower 10, and formed with an inlet hole and an outlet hole so as to be rotated by inflowing and outflowing water and generate electricity energy, a generator fixing member 120 formed in the shape of a paper cup in cross section, by which the power generation unit 110 is inserted to a center of a bottom surface and fixed so as to allow water discharged through the outlet holes to flow, a ground part 130 made of a conductor and installed with one end being seated on the generator fixing member 120 to be connected to a (−) electrode, and with front and bottom surfaces being open so as to allow inflowing water to flow while coming in contact with a surface, a gap maintaining member 140 installed within the ground part 130, with one end being airtightly retained on an outer peripheral surface of the power generation unit 110 by the intervention of an O-ring, and with the outer peripheral surface gradually expanding from one end to the other end, a high voltage part 150 made of a conductor, which has one end seated on the gap maintaining member 140 and connected to a (+) electrode to enable static electricity to be generated between itself and the ground part 130, and a high voltage converter 160 fixedly installed by epoxy filled in the gap maintaining member 140, and converting a voltage supplied from the power generation unit 110 into a high voltage so that the (+) electrode is connected to the high voltage part 150 and the (−) electrode is connected to the ground part 120.

On the outer peripheral surface of the gap maintaining member 140, there are further provided a plurality of gap maintaining protrusions 141 formed at regular intervals in a radial direction so as to maintain a constant gap between the ground part 130 and the high voltage part 150.

5

Figure 2:
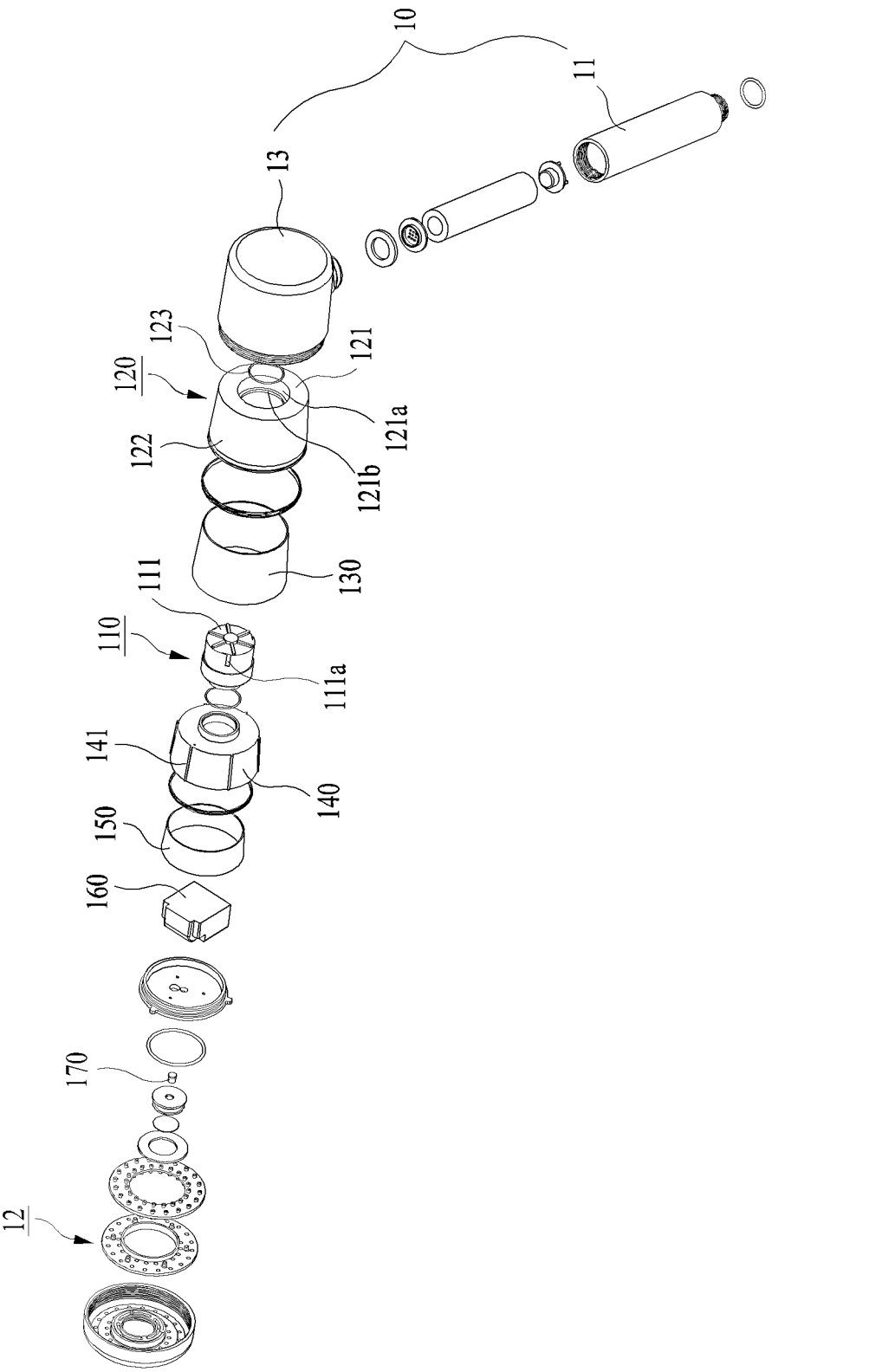
FIG. 2 is an exploded view showing the water treatment system for a shower in one direction according to an embodiment.
Figure 3:
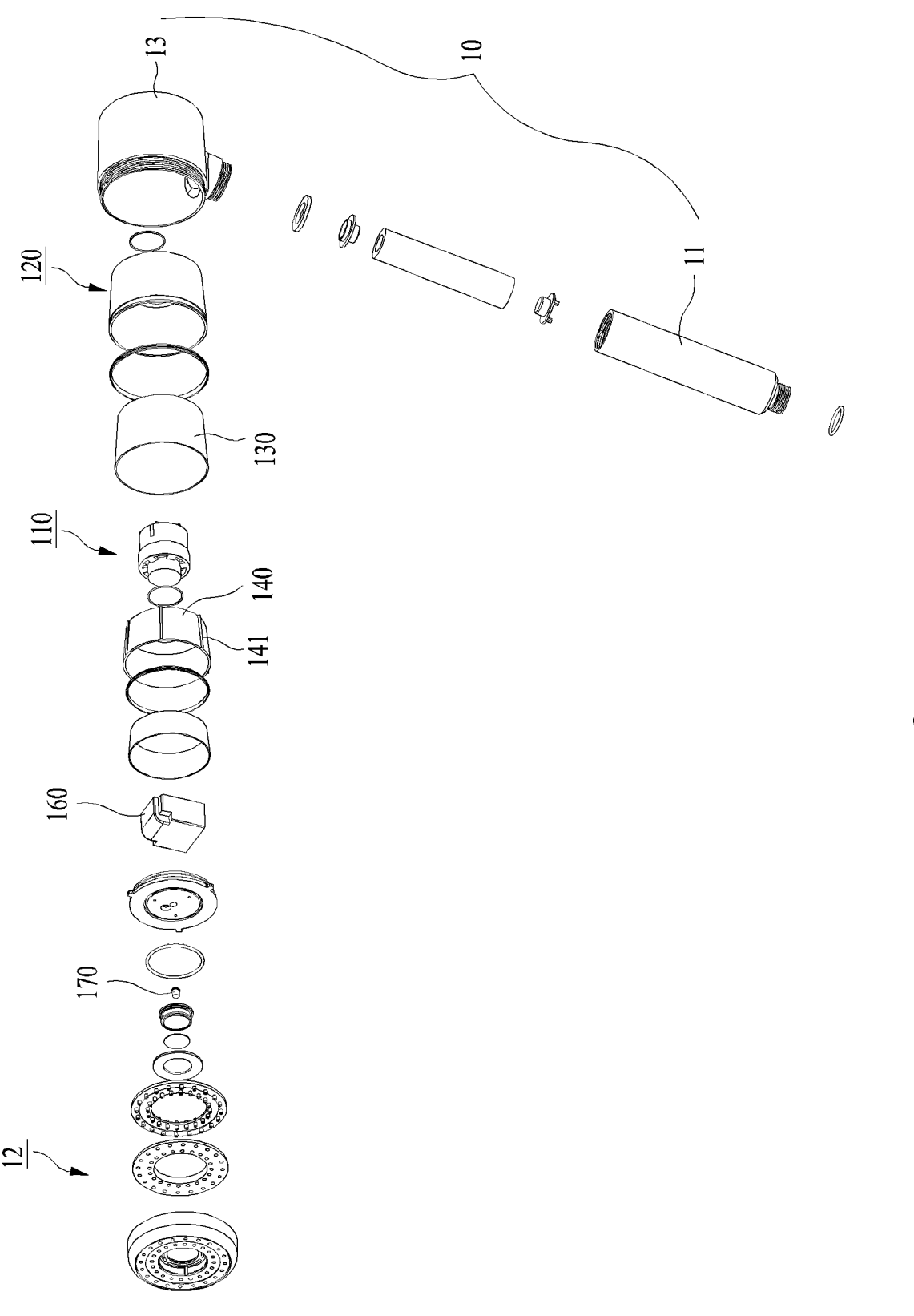
FIG. 3 is an exploded view showing the water treatment system for a shower in another direction according to an embodiment.
Figure 4:
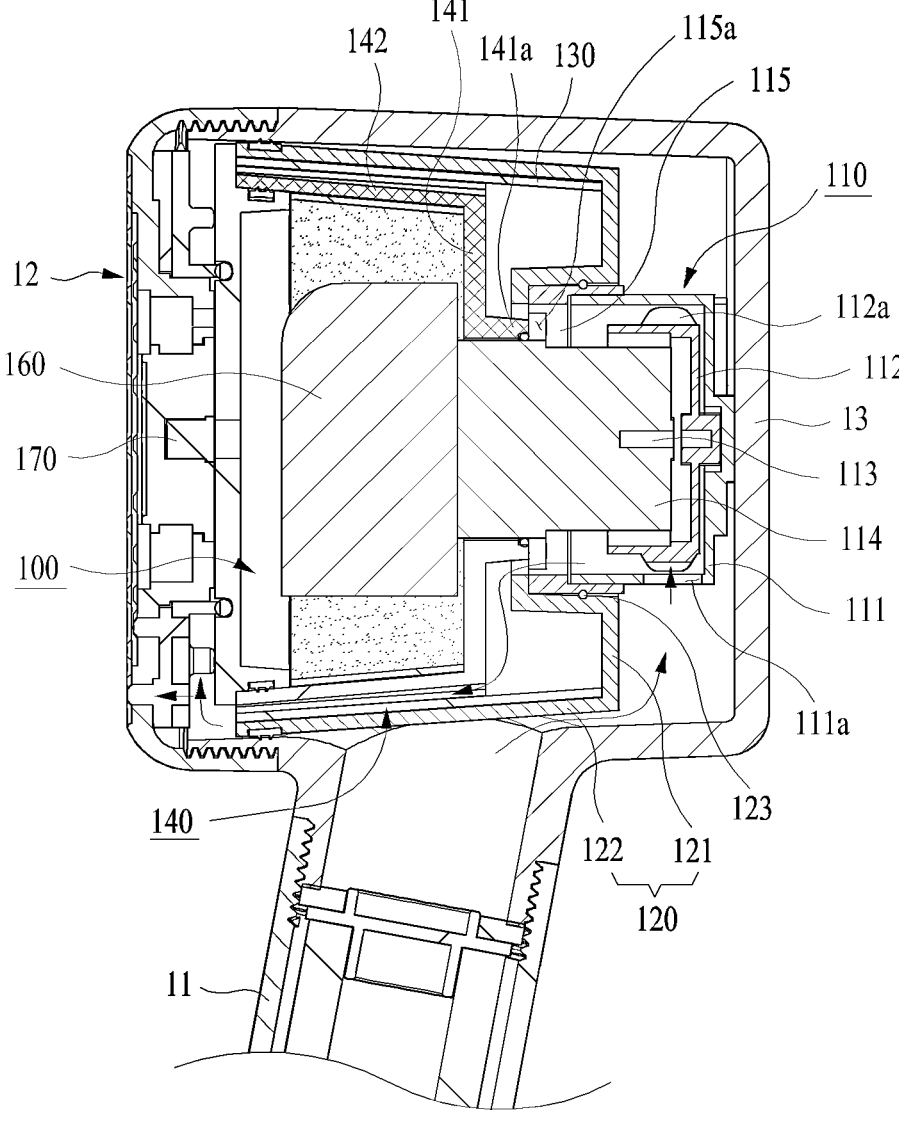
FIG. 4 is a cross-sectional view of the water treatment system for a shower in an assembled state according to an embodiment.
Figure 5:
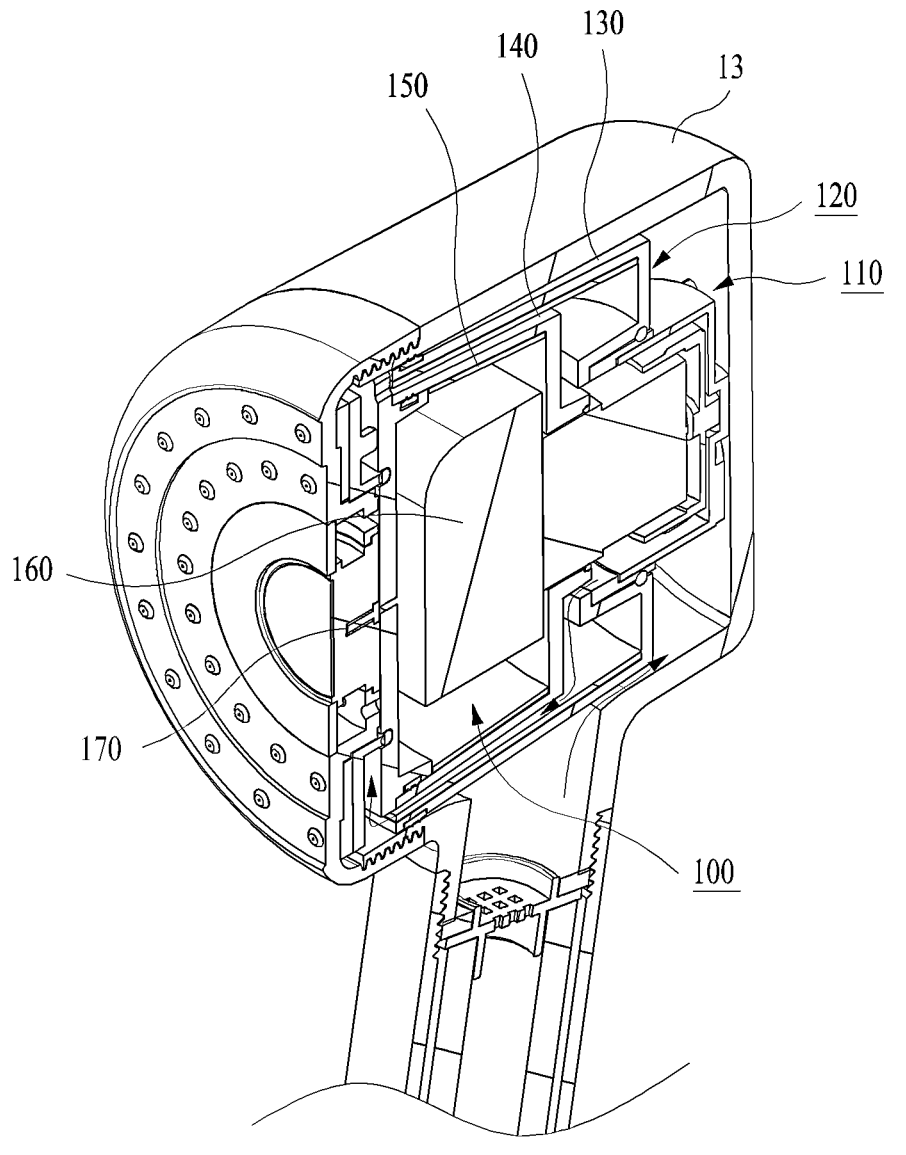
FIG. 5 is a half-sectional perspective view showing the water treatment system for a shower according to an embodiment.

In addition, there is further provided an LED lamp 170 installed between the front cap 120 and the water treatment device 100 and turned on by the power supplied from the power generation unit 110 to notify the user whether the water treatment device is in operation or not. Hereinafter, the water treatment system for a shower described above will be described in more detail with reference to FIGS. 1 to 5.

First, the power generation unit 110 of the water treatment system for a shower is installed in the space formed in the head 13 of the shower 10 and is capable of generating electrical energy using the flowing water in the handle unit 11 and supplying voltages to the high voltage converter 160.

That is, the power generation unit 110 may include a power generation housing 111 formed within the head 13, and including an open front side, and a plurality of inlet holes 111*a* formed at regular intervals in the radial direction on a lower portion of the outer peripheral surface to allow an inflow of water from the handle 11 therethrough, a power generation rotating member 112 installed within the power generation housing 111 and including a power generation wing portion 112*a* formed on an outer peripheral surface to be rotated by water inflowing through the inlet hole 111*a*, a generator 114 connected to the power generation rotating member 112 via a shaft 113 and capable of generating electrical power in response to the rotation of the shaft 113, and a cover 115 including one end fixedly connected to the power generation housing 111, and an insertion hole (reference numeral omitted) formed in a front center to receive the generator 114 inserted therein, and a plurality of outlet holes 115*a* formed in the radial direction on one side of the insertion hole to discharge the inflow water.

The generator fixing member 120 is formed so as to be inserted into the head 13, thus allowing the power generation unit 110 to be inserted to the center of a bottom surface and fixed therein, and is also formed in the shape of a paper cup in cross section, thus allowing the water discharged through the outlet holes 115*a* of the power generation unit 110 to flow.

That is, the generator fixing member 120 includes a receiving part 121*a* protruding and including a receiving hole formed in a central portion to receive the power generation unit 110 therein, in which the receiving part 121*a* includes a bottom plate 121 having an O-ring recess 121*b* formed on an inner peripheral surface for engagement with an O-ring 122, and an outer peripheral wall 122 protruding from a leading edge of the bottom plate 121 and inclined in one direction.

The ground part 130 is made of a conductor and installed such that one end thereof is seated on the generator fixing member 120 so as to be connected to the (−) electrode of the high voltage converter 160, and the front and bottom surfaces are formed in the shape of a paper cup with an open side in cross section, thus allowing the inflowing water to flow while coming in contact with a surface.

The gap maintaining member 140 is installed within the ground part 130, with one end being airtightly retained on the outer peripheral surface of the power generation unit 110 by the intervention of an O-ring, and with the outer peripheral surface gradually expanding from one end to the other end such that a distance gradually narrows from the lower end to the upper end of the inner peripheral surface of the ground part 110, thus allowing the flowing water to advance while sufficiently contacting the surface of the ground part.

That is, the gap maintaining member 140 includes: a gap maintaining receiving part 141*a* protruding and including a gap maintaining receiving hole (reference numeral omitted) to receive the generator 114 of the power generation unit 110 therein; a gap maintaining bottom plate 141 including a gap maintaining recess formed on an inner peripheral surface of the gap maintaining receiving part 141*a* for engagement with an O-ring (reference numeral omitted); and a gap maintaining outer peripheral wall 142 protruding in one direction from a leading edge of the gap maintaining bottom plate 141, in which the gap maintaining outer peripheral wall 142 is inclined such that a distance gradually narrows from the lower end to the upper end of the inner peripheral surface of the ground part 130 to allow the flowing water to advance while sufficiently contacting the surface of the ground part 130.

The high voltage part 150 is made of a conductor and installed with one end being inserted into the gap maintaining member 140 and connected to the (+) electrode, so as to allow static electricity to be generated between itself and the ground part 130.

That is, the high voltage part 150 is formed in a cylindrical shape with the front and bottom sides open, and installed by inserting one end into the gap maintaining member 140 and connected to the (+) electrode, in which the outer peripheral surface is inclined to be gradually expanded to allow static electricity to be generated between the high voltage part and the ground part 130.

The high voltage converter 160 is fixedly installed by epoxy filled in the gap maintaining member 140 to convert a voltage supplied from the power generation unit 110 into a high voltage so that the (+) electrode is connected to the high voltage part 151 and the (−) electrode is connected to the ground part.

That is, the high voltage converter 160 is positioned in the gap maintaining member 140 and fixed by epoxy filling, and is provided to convert the voltage supplied from the power generation unit 110 into high voltage so that the (+) electrode is connected to the high voltage part 150 and the (−) electrode is connected to the ground part 130, thereby allowing static electricity to be generated between the high voltage part 150 and the ground part 130.

Accordingly, when the shower including the water treatment device for a shower according to the embodiments described above installed in the head is connected to the hose connected to the faucet, upon supply of water, water flows into the head and advances through a plurality of inlet holes 111*a* formed in the power generation housing 111 of the power generation unit 110, as shown in FIGS. 1 to 5.

The inflowing water in the power generation housing 111 of the power generation unit 110 causes the power generation rotating member 112 to be rotated, causing the shaft 113 to be rotated in turn, and accordingly, the generator 114 generates electrical power.

The electrical power generated by the generator is applied to the high voltage converter 160, and the electrical power applied to the high voltage converter 160 is converted into a high voltage, so that (+) electrode is connected to the high voltage part 150 and (−) electrode is connected to the ground part 130.

As a result, static electricity is generated between the high voltage part 150 and the ground part 130.

At this time, the hardness of the water changes as the water passes through the outlet holes 115*a* of the power generation unit 110, and through the static electricity generated between the ground part 130 and the high voltage part 150.

As described above, since the water treatment system for a shower according to the embodiments is configured to change the hardness of water using self-generation by the power generation unit, it is possible to obtain water with changed hardness for a long period of time without using external power.

The above description is merely illustrative of the technical idea of the present invention, and those of ordinary skill in the art to which the present invention pertains will be able to make various modifications and variations without departing from the essential characteristics of the present invention. Accordingly, the embodiments described herein in the present invention are not intended to limit the technical idea of the present invention, but to explain the technical idea, and the scope of the technical idea of the present invention is not limited by these an embodiment. The scope of protection of the present invention should be interpreted by the following claims, and all technical ideas within the scope equivalent thereto should be construed as being included in the scope of the present invention.

The invention claimed is:

1. A water treatment system for a shower, comprising:
a power generation unit (110) installed therein in a space defined in a head (13) of the shower (10), and formed with an inlet hole and an outlet hole so as to be rotated by inflowing and outflowing water and generate electricity energy;
a generator fixing member (120) formed in the shape of a paper cup in cross section, by which the power generation unit (110) is inserted to a center of a bottom surface and fixed so as to allow water discharged through the outlet holes to flow;
a ground part (130) made of a conductor and installed with one end being seated on the generator fixing member (120) to be connected to a (−) electrode, and with front and bottom surfaces being open so as to allow inflowing water to flow while coming in contact with a surface;
a gap maintaining member (140) installed within the ground part (130), with one end being airtightly retained on an outer peripheral surface of the power generation unit (110) by the intervention of an O-ring, and with the outer peripheral surface gradually expanding from one end to the other end;
a high voltage part (150) made of a conductor, which has one end seated on the gap maintaining member (140)

and connected to a (+) electrode to enable static electricity to be generated between itself and the ground part (130); and
a high voltage converter (160) fixedly installed by epoxy filled in the gap maintaining member (140), and converting a voltage supplied from the power generation unit (110) into a high voltage so that the (+) electrode is connected to the high voltage part (150) and the (−) electrode is connected to the ground part (120).

2. The water treatment system for a shower according to claim 1, wherein the gap maintaining member (140) further includes a plurality of gap maintaining protrusions (141) formed on an outer peripheral surface at regular intervals in a radial direction so as to maintain a constant gap between the ground part (130) and the high voltage part (150).

3. The water treatment system for a shower according to claim 1, wherein the generator fixing member (120) includes a receiving part (121a) protruding and including a receiving hole formed in a central portion to receive the power generation unit (110) therein, wherein the receiving part (121a) includes a bottom plate (121) having an O-ring recess (121b) formed on an inner peripheral surface for engagement with an O-ring (122), and an outer peripheral wall (122) protruding from a leading edge of the bottom plate (121) and inclined in one direction.

4. The water treatment system for a shower according to claim 1, wherein the gap maintaining member (140) includes: a gap maintaining receiving part (141a) protruding and including a gap maintaining receiving hole so as to receive the power generation unit (110) therein; a gap maintaining bottom plate (141) including a gap maintaining recess formed on an inner peripheral surface of the gap maintaining receiving part (141a) for engagement with an O-ring; and a gap maintaining outer peripheral wall (142) protruding in one direction from a leading edge of the gap maintaining bottom plate (141), wherein the gap maintaining outer peripheral wall (142) is inclined such that a distance gradually narrows from the lower end to the upper end of the inner peripheral surface of the ground part (130) to allow the flowing water to advance while sufficiently contacting the surface of the ground part (130).

* * * * *